(12) United States Patent
Shin

(10) Patent No.: US 9,063,654 B2
(45) Date of Patent: Jun. 23, 2015

(54) TERMINAL APPARATUS AND METHOD FOR SUPPORTING SMART TOUCH OPERATION

(75) Inventor: Dong Chan Shin, Seoul (KR)

(73) Assignee: Pantech Co., Ltd., Seoul (KR)

( * ) Notice: Subject to any disclaimer, the term of this patent is extended or adjusted under 35 U.S.C. 154(b) by 352 days.

(21) Appl. No.: 13/603,376

(22) Filed: Sep. 4, 2012

(65) Prior Publication Data

US 2013/0063378 A1    Mar. 14, 2013

(30) Foreign Application Priority Data

Sep. 9, 2011  (KR) .......................... 10-2011-0091901

(51) Int. Cl.
*G06F 3/041*  (2006.01)
*G06F 3/0488*  (2013.01)

(52) U.S. Cl.
CPC ........ *G06F 3/04886* (2013.01); *G06F 3/04883* (2013.01)

(58) Field of Classification Search
CPC ....... G06F 3/016; G06F 3/041; G06F 3/0488; G06F 3/04883; G06F 3/04886; H04M 1/72522; H04M 1/72552
USPC ............. 345/156, 173, 179; 178/18.01, 19.01
See application file for complete search history.

(56) References Cited

U.S. PATENT DOCUMENTS

| | | | | |
|---|---|---|---|---|
| 8,860,680 B2 * | 10/2014 | Miyazaki | ...................... | 345/173 |
| 2008/0122796 A1 * | 5/2008 | Jobs et al. | ...................... | 345/173 |
| 2008/0218535 A1 * | 9/2008 | Forstall et al. | ................ | 345/690 |
| 2008/0297482 A1 * | 12/2008 | Weiss | .............................. | 345/173 |
| 2009/0122022 A1 * | 5/2009 | Park et al. | ...................... | 345/173 |
| 2009/0193361 A1 * | 7/2009 | Lee et al. | ....................... | 715/810 |
| 2010/0079397 A1 * | 4/2010 | Yang et al. | ..................... | 345/173 |
| 2010/0251161 A1 * | 9/2010 | Fong et al. | ..................... | 715/773 |
| 2010/0251176 A1 * | 9/2010 | Fong et al. | ..................... | 715/821 |
| 2011/0221684 A1 * | 9/2011 | Rydenhag | ...................... | 345/173 |
| 2012/0044149 A1 * | 2/2012 | Son et al. | ....................... | 345/169 |
| 2012/0092288 A1 * | 4/2012 | Wadia | ............................ | 345/174 |
| 2012/0113008 A1 * | 5/2012 | Makinen et al. | ............... | 345/168 |
| 2012/0240044 A1 * | 9/2012 | Johnson et al. | ............... | 715/716 |

FOREIGN PATENT DOCUMENTS

| | | |
|---|---|---|
| KR | 1020080034110 | 4/2008 |
| KR | 1020080097114 | 11/2008 |
| KR | 1020090087177 | 8/2009 |
| KR | 10-2010-0062077 | 6/2010 |
| KR | 1020110026359 | 3/2011 |

* cited by examiner

*Primary Examiner* — Joe H Cheng
(74) *Attorney, Agent, or Firm* — H.C. Park & Associates, PLC

(57) ABSTRACT

A terminal apparatus includes an interface to detect a touch input, to detect a touch region corresponding to the touch input, and to identify an object that is overlapped by the touch input by at least a reference percentage in the touch region as a first object; a processing unit to generate a second object based on the first object, and to display the second object in an untouched region; and a control unit to execute an operation corresponding to the second object. A method for executing an operation according to a touch input includes detecting a touch input and a corresponding touch region; identifying an object overlapped by at least a reference percentage in the touch region as a first object; generating a second object based on the first object; displaying the second object in an untouched region; and executing an operation corresponding to the second object.

19 Claims, 7 Drawing Sheets

FIG. 5
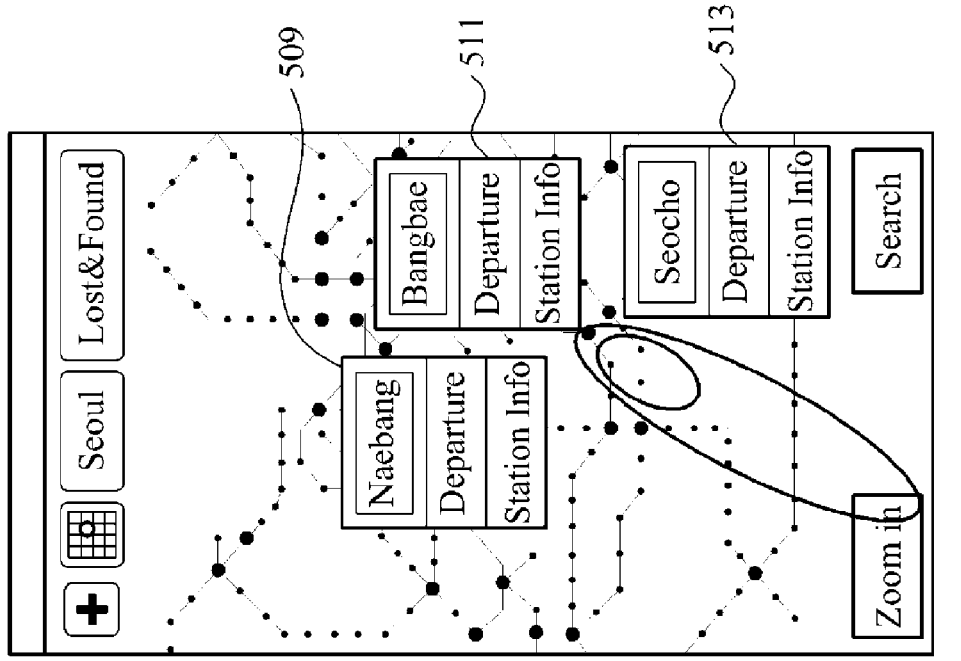
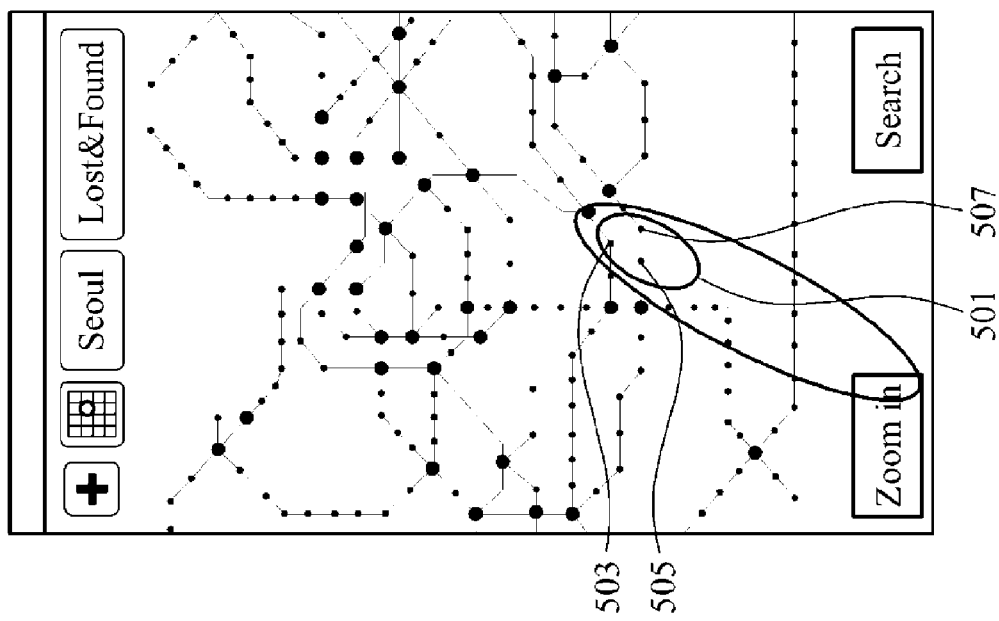

FIG. 6

| Get Free Sample | | |
|---|---|---|
| Economy | Sport | Entertainment |

- Senior officers from Navy and Air Force absent ...  ← 603
- Communication companies' pressure? "Free call" ...  ← 605
- Workplaces not paying minimum wage are...  ← 601
- Producer Taeho KIM "Myongsu Park, G-Dragon...
- How to climb mountains without muscle damage...
- Jacheol Koo denied playing soccer in The Korean...

| 7 | Juyoung Park Marriage | ↑ 225 |
| 8 | Economy Census | ↑ 339 |
| 9 | Kaeun's mom regular employee | new |
| 10 | IU present photo | ↑ 145 |

---

607 → Senior officers...     Entertainment     Communication...  ← 609

- Senior officers from Navy
- Communication companies'
- Workplaces not paying minimum wage are...
- Producer Taeho KIM "Myongsu Park, G-Dragon...
- How to climb mountains without muscle damage...
- Jacheol Koo denied playing soccer in The Korean...

| 7 | Juyoung Park Marriage | ↑ 225 |
| 8 | Economy Census | ↑ 339 |
| 9 | Kaeun's mom regular employee | new |
| 10 | IU present photo | ↑ 145 |

TERMINAL APPARATUS AND METHOD FOR SUPPORTING SMART TOUCH OPERATION

CROSS-REFERENCE TO RELATED APPLICATION

This application claims priority from and the benefit under 35 U.S.C. §119(a) of Korean Patent Application No. 10-2011-0091901, filed on Sep. 9, 2011, which is incorporated by reference for all purposes as if fully set forth herein.

BACKGROUND

1. Field

The following description relates to a smart touch technology, and more specifically to a smart touch technology to support a display of an overlapped object.

2. Discussion of the Background

A display module that supports or receives a touch input may be applied to an electronic device (e.g., a smart phone, personal digital assistant, a mobile computing device, and the like), a user interface (UI), such as a digital keyboard or touch screen, may be used to receive a touch input.

In order to execute or select a target object among a plurality of objects in a display region, the target object may be selected by a touch input on the UI of the electronic device. If a gap between the target object and surrounding objects is narrow, inaccurate selection of the target object or selection of multiple objects may occur, which may lead to execution of the wrong object, contrary to an intention of a user.

Accordingly, a technology to enable the user to more easily select and/or execute a target object may be beneficial.

SUMMARY

Exemplary embodiments of the present invention provide a terminal apparatus to support a smart touch operation and method for supporting a smart touch operation.

Additional features of the invention will be set forth in the description which follows, and in part will be apparent from the description, or may be learned by practice of the invention.

Exemplary embodiments of the present invention provide a terminal apparatus including an interface to detect a touch input, to detect a touch region corresponding to the touch input, and to identify an object that is overlapped by the touch input at least a reference percentage in the touch region as a first object; a processing unit to generate a second object based on the first object, and to display the second object in an untouched region; and a control unit to execute an operation corresponding to the second object.

Exemplary embodiments of the present invention provide a method for executing an operation according to a touch input including detecting a touch input and a corresponding touch region on a display of a terminal; identifying an object overlapped by at least a reference percentage in the touch region as a first object; generating a second object based on the first object; displaying the second object in an untouched region; and executing an operation corresponding to the second object.

Exemplary embodiments of the present invention provide a method for executing an operation according to a touch input including detecting a touch input and a corresponding touch region on a display of a terminal; identifying an object overlapped by at least a reference percentage in the touch region as a first object; determining a direction of the touch input; generating a second object based on the first object; displaying the second object in an untouched region based on the direction of the touch input; and executing an operation corresponding to the second object if the second object is selected for execution, in which the second object comprises information associated with the first object.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5 is a diagram illustrating a smart touch operation according to an exemplary embodiment of the present invention.

FIG. 6 is a diagram illustrating a smart touch operation according to an exemplary embodiment of the present invention.

DETAILED DESCRIPTION OF THE ILLUSTRATED EMBODIMENTS

Figure 1:
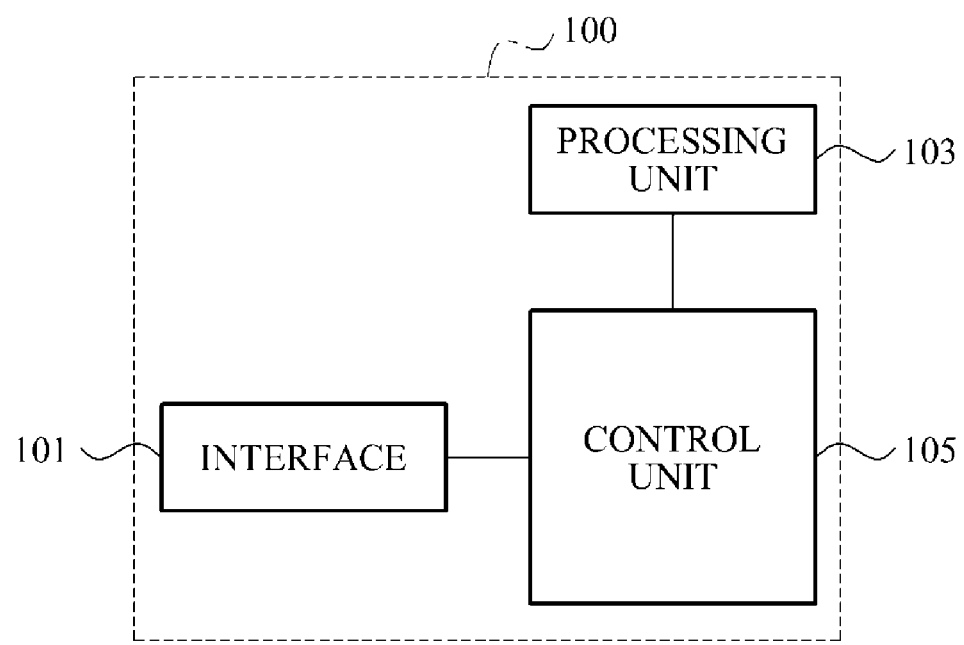
FIG. 1 is a block diagram illustrating a terminal apparatus to support a smart touch operation according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

It will be understood that when an element is referred to as being "connected to" another element, it can be directly connected to the other element, or intervening elements may be present.

FIG. 1 is a block diagram illustrating a terminal apparatus to support a smart touch operation according to an exemplary embodiment of the present invention.

Referring to FIG. 1, the terminal apparatus 100 may include an interface 101, a processing unit 103, and a control unit 105.

The interface 101 may detect or recognize a region touched by a user on a screen, and may determine whether one or more selectable objects may be included in the touched region. More particularly, the interface 101 may recognize the region touched by the user or a different source, and may identify first set of objects or first objects (hereinafter, "first objects" may refer to a first set of objects or one or more objects included in the first set of objects). The first object may refer to objects that are at least partially overlapped in the touched region by a touch input (e.g., a finger or input apparatus touching the touched region may overlaps one or more keys on a digital keyboard). The interface 101 may identify, among a plurality of objects displayed on the screen, N number of objects having a reference percentage or higher (e.g., 15% and above) of their displayed image included in the touched region as the first objects. Here, N may be a natural number.

Although an overlap of an object is described as being overlapped by a touch input, it is not limited thereto. An object may be overlapped, without limitation, by a covering, a shadow, a light signal, an object on the display screen, a stylus, or other devices that may provide a signal indicating an overlap of the object.

For example, a total of 4 objects may be identified as being at least partially overlapped by a touch input in the recognized touched region, but not all 4 objects may be s considered as a first object. More specifically, if an object_190 1, an object_190 2, an object_190 3, and an object_190 4, among the plurality of objects displayed on the screen, are overlapped by a touch input in percentages of 55%, 21%, 9%, and 15%, respectively, and the reference percentage is determined to be 15%, the interface 101 may identify the object_190 1, the object_190 2, and the object_190 4 having met or exceeded the reference percentages of overlap as the first objects.

Here the first object is described as an object overlapped by a reference percentage or higher, however, the description of the first object is not limited thereto. The first object may be an object overlapped by a percentage higher than but not equal to the reference percentage, or less than the reference percentage.

The interface 101 may determine an input direction of the touch using at least one of a form or shape of the recognized touched region and a touch pressure related to the touch or touch input with respect to time. In an example, the form or shape of the recognized touched region may be determined based on continuous touch movement (e.g., a user dragging his or her finger from a lower right hand corner to a upper left hand corner may provide a diagonal region or shape). For example, the interface 101 may recognize an elliptical or diagonally shaped formed region, which may begin from a lower right end point and extends to an upper left end point, as the form of the touched region. If a touch pressure is detected in an upper portion of the elliptical shape at the time of detection, that is, the upper left end, the interface 101 may determine a direction from the lower right end to the upper left end to be the input direction of the touch.

The processing unit 103 may generate one or more objects based on the first objects as second objects, and display the second objects (hereinafter, "second objects" may refer to a second set of objects or one or more objects included in the second set of objects). The second objects may be displayed in an untouched region of the screen. More particularly, the processing unit 103 may display the second objects, which may correspond to one or more objects of the first set of objects, in the untouched region of the screen. In an example, the processing unit 103 may display one or more objects in the second set of objects in a pop-up form in an untouched region so that the respective second objects may not be obscured by the touch.

The processing unit 103 may display the second objects in a portion of the untouched region that is selected according to the input direction of the touch so that the second objects may be positioned in different locations according to the recognized touch or touch direction. Accordingly, the second objects may not be obscured by a touch input, which may be provided by a finger or a stylus input pen.

For example, if the input direction of the touch is determined as a direction going from the lower right region to the upper left region, the processing unit 103 may display the second objects in other directions except for a southeast direction, which may correspond to the direction from the upper left region to the lower right region of the touched region. Accordingly, the second objects, which may be selected for execution, may be displayed with reduced risk of obstruction by the touch.

If the touched region is recognized as being in close proximity to a boundary of the screen and the input direction faces the boundary, the processing unit 103 may display the second objects in a direction that is rotated by a reference angle based on the input direction. For example, in a case where the screen is in a rectangular form, the touched region may be s recognized as being in close proximity to an upper-left portion of the screen, such as an upper-left corner portion. If the input direction faces the corner portion, the processing unit 103 may display the second objects in a direction that is rotated by a reference range of angles (e.g., 5° to 45°) based on the input direction so that the second set of objects may not be obscured by a touch input or an input apparatus touching the screen. Accordingly, the second objects may be positioned within the screen.

The processing unit 103 may display the second objects, which may be adjusted in size based on respective percentages of overlap of the first objects in the touched region. For example, if a percentage of overlap by a touch input of an object in the touched region corresponds to 50%, the processing unit 103 may determine that the object in the touched region is a first object. The processing unit 103 may further expand the size of the first object by a factor of 2 and may display the expanded first object as a second object. If the percentage of overlap of an object by a touch input in the touched region corresponds to 30%, the processing unit 103 may determine that the object is a first object, and expand the first object by a factor of 1.3 to provide a second object. In an example, the sizes of the first objects in the two described scenarios may be identical or similar. Also, if the percentage of overlap of an object by a touch input in the touched region corresponds to 50%, the processing unit 103 may generate and display a second object with a dimension of 10 millimeter (mm)×10 mm. If the percentage of overlap of an object by a touch input in the touched region corresponds to 30%, the processing unit 103 may generate and display a second object with a dimensions of 7 mm×7 mm. Further, while the second objects are described as being expanded in proportion to the percentage of overlap, the second objects are not limited thereto. The second objects may be adjusted in size to s be larger or smaller than the first object and in varying proportions.

If a first object has at least a reference percentage of overlap in the touched region, the processing unit 103 may adjust a size of the first object to be greater than its normal size as a second object so that the second object may be displayed to be recognized more easily or displayed with reduced risk of obstruction, if any.

The processing unit 103 may display second objects, which may include expanded textual information included in the first objects, or may display second objects as processed information associated with the first objects.

For example, the processing unit 103 may display a second object as textual information, which may be expanded from the information included in the first object. The second object may expand a part of article information included in the first object, which may be an article object (e.g., letters "ion" in the word "communication") that is overlapped in a touched region by a touch input. Article objects may be displayed on a screen providing a webpage, documents, images, and the like. The processing unit 103 may parse letter information found on a webpage positioned in the touched region recognized by the interface 101. Further, if the article object is associated with a hyperlink to a webpage or another source, the processing unit 103 may identify the letter information as an article object.

The processing unit 103 may display a first object as small dots indicating a subway station, and a corresponding second object including station information on a subway route map. The second object may also include a menu to set or view departure station or arrival station information with respect to a corresponding station. More specifically, the second object may include processed information associated with a station object that may be overlapped by a touch input in a touched region.

The control unit 105 may execute an operation corresponding to the second object if the second object is selected. The operation of the second object may include, without limitation, inputting of information corresponding to the second object (e.g., key letters, numbers, symbols, images, and the like), activating a hyperlink, activating an application associated with the second object, downloading a corresponding file, and the like. For example, in a case where the second object corresponds to a keypad letter object, the control unit 105 may input a keypad letter into an input window if the second object corresponding to the keypad letter is selected. In a case where the second object corresponds to an article information object, the control unit 105 may provide the selected article information via a new webpage if the corresponding second object is selected.

The control unit 105 may control the interface 101 to restrict a selection of a first object while a second object is being displayed.

Also, if a second object is not selected within a reference time period after the second object is displayed, the control unit 105 may remove the display of the second object and may return to an idle state for a selection or touch of a first object.

Figure 2:
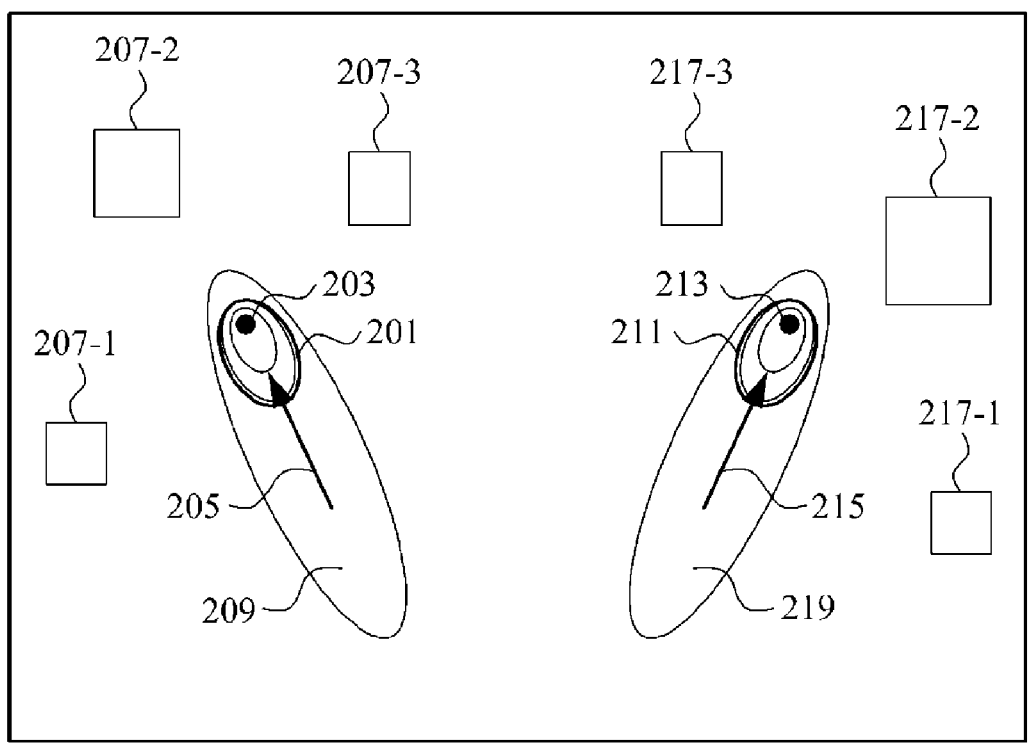
FIG. 2 is a diagram illustrating a smart touch operation according to an exemplary embodiment of the present invention.

FIG. 2 is a diagram illustrating a smart touch operation according to an exemplary embodiment of the present invention.

Referring to FIG. 2, the terminal apparatus may recognize a touched region if a screen is touched, and may determine an input direction of the touch using at least one of a form or shape of the recognized touched region and a touch pressure associated with the touch.

In an example, the terminal apparatus may recognize an elliptical touched region 201. Although not illustrated, the elliptical touched region 201 may be oriented from a lower right region to an upper left region with respect to time, and may determine an input direction 205 based on this movement. Further, the input direction 205 may be determined to be in a direction from the lower right region to the upper left region if a touch pressure 203 is detected in an upper portion of the ellipse, that is, the upper left region. In this instance, the terminal apparatus may recognize the direction of the touch based on strength or intensity of the touch pressure 203 with respect to time.

For example, if touch pressure is higher at bottom right hand corner of the touch region initially, and the touch pressure is dragged to the upper left hand corner with respect to time, it may be determined that the input direction 205 is in the direction corresponding to the dragged touch motion. Accordingly, since touch pressure may be higher at the subsequent touch point in comparison to the previously touched point, an input direction of the touch may be detected based on change in touch pressure with respect to time or continuous touch movement to determine the input direction of the touch.

If the direction from the lower right region to the upper left region is determined to be the input direction 205 of the touch, the terminal apparatus may display second objects 207-1, 207-2, and 207-3 in directions except for a southeast direction, which may coincide with the touched region. Accordingly, the respective second objects may not be displayed in the direction from the lower right region to the upper left region based on the touched region 201 so that the second objects 207-1, 207-2, and 207-3 may not be obscured by a touch input or an input apparatus 209. The input apparatus 209 may be positioned in the southeast direction and may be touching the screen. In an example, the input apparatus may include, without limitation, a finger, s a stylus, a touch input pen, or other similar apparatus to provide input.

Referring again to FIG. 2, the terminal apparatus may recognize an elliptical touched region 211. Although not illustrated, the elliptical touch region 211 may be oriented from a lower left region to an upper right region with respect to time, and may determine an input direction 215 based on this movement. Further, the terminal apparatus may determine an input direction 215 to be from the lower left region to the upper right region if a touch pressure 213 is detected in an upper portion of the ellipse, that is, the upper right region.

If the direction from the lower left region to the upper right region is determined to be the input direction 215 of the touch, the terminal apparatus may display second objects 217-1, 217-2, and 217-3 in directions except for a southwest direction, which may coincide with the touched region. Accordingly, the respective second objects may not be displayed in the direction from the lower left region to the upper right region so that the second objects 217-1, 217-2, and 217-3 may not be obscured by a touch input or an input apparatus 219. The input apparatus 219 may be positioned in the southwest direction and may be touching the screen. In an example, the input apparatus may include, without limitation, a finger, a stylus, a touch input pen, or other similar apparatus to provide input.

Figure 3:
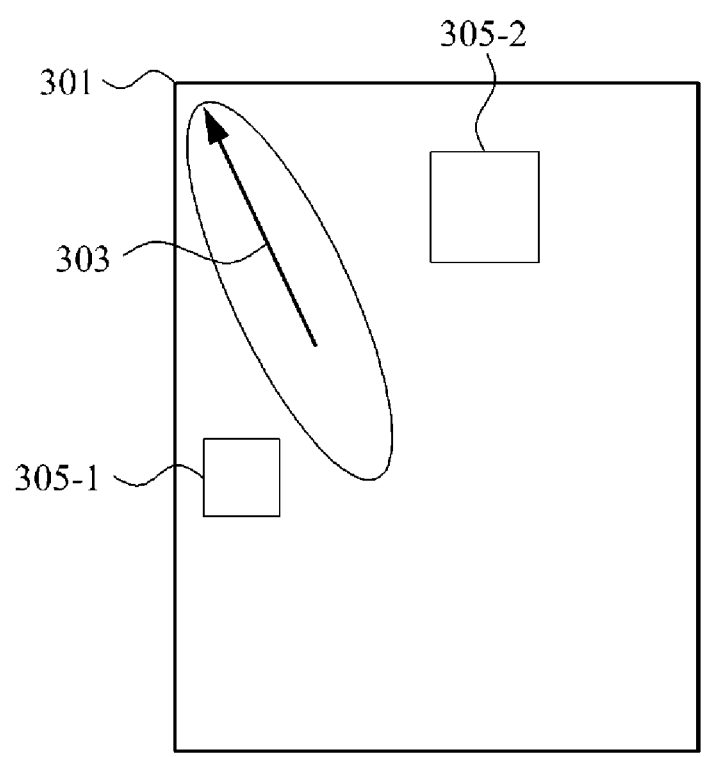
FIG. 3 is a diagram illustrating a smart touch operation according to an exemplary embodiment of the present invention.

FIG. 3 is a diagram illustrating a smart touch operation according to an exemplary embodiment of the present invention.

Referring to FIG. 3, if a touched region is recognized as being in close proximity to a boundary of a screen and an input direction of a touch faces the boundary or moves towards the boundary, the terminal apparatus may display second objects in a direction that may be rotated by a reference angle from the input direction.

Referring to FIG. 3, a touched region may be recognized as being in close proximity to an upper-left portion of the screen, such as a corner portion 301, which is a boundary of the screen. If an input direction 303 faces the corner portion 301, the terminal apparatus may display second objects 305-1 and 305-2 in a direction that is rotated by a reference range of angles (e.g., 10° or 20°) based on the input direction 303 so that the second objects 305-1 and 305-2 may not be obscured by a touched path, which is illustrated in an elliptical shape enclosing the input direction 303. Accordingly, the second objects may be positioned within the screen.

Figure 4:
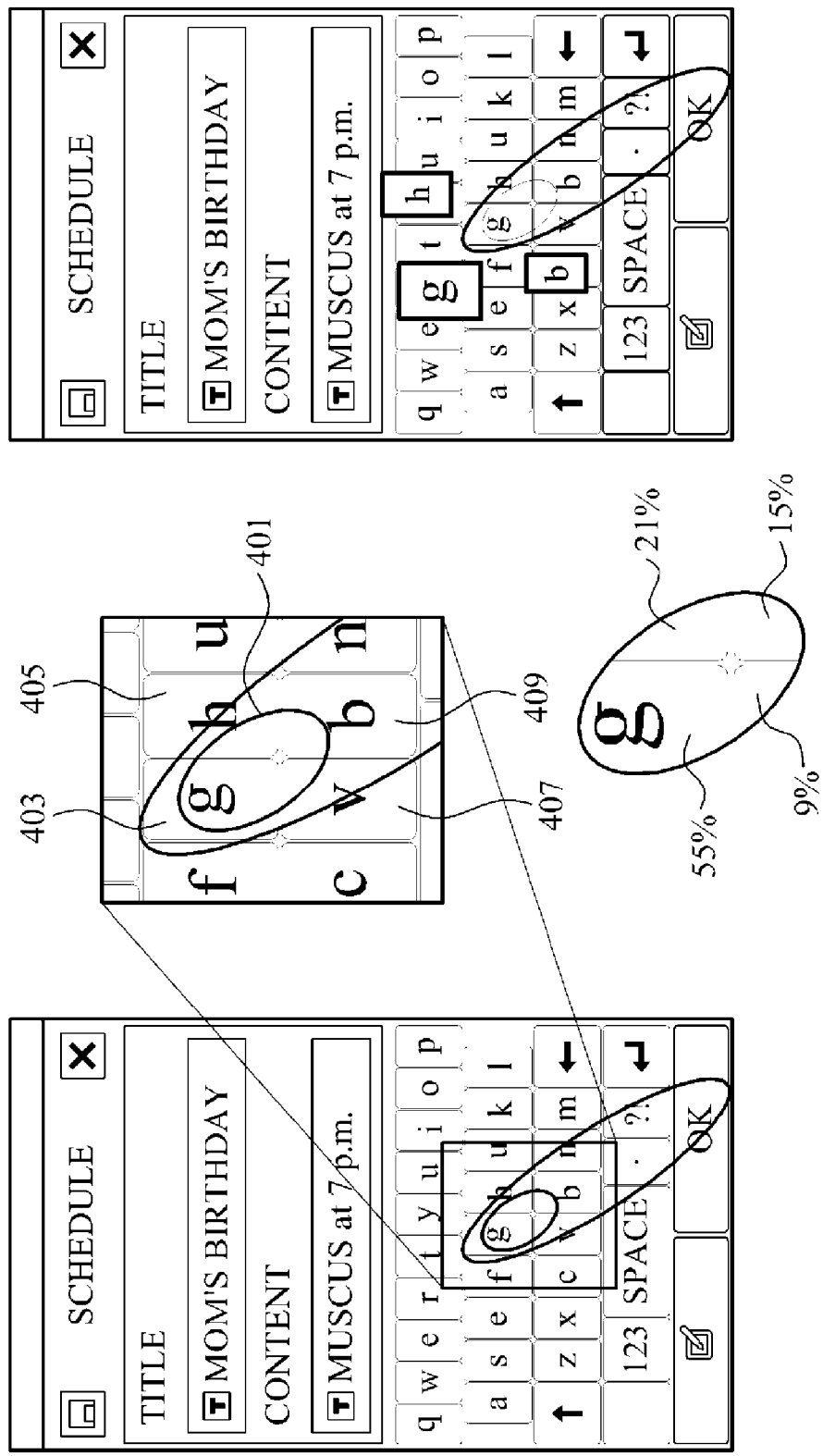
FIG. 4 is a diagram illustrating a smart touch operation according to an exemplary embodiment of the present invention.

FIG. 4 is a diagram illustrating a smart touch operation according to an exemplary embodiment of the present invention.

Referring to FIG. 4, the terminal apparatus may recognize a touched region if a screen is touched, and may identify one or more objects that are at least partially overlapped by a touch input in the recognized touched region as first objects. The terminal apparatus may display second objects corresponding to the first objects in an untouched region of the screen.

Referring to FIG. 4, the terminal apparatus may recognize a touched region 401 if a screen providing a digital keypad is touched, and may identify objects that are at least partially overlapped by a touch input in the recognized touched region 401. As shown in FIG. 4, a 'g' object 403, an 'h' object 405, a 'v' object 407, and a 'b' object 409 may be identified as being overlapped by the touch input. The terminal apparatus may determine, which among the objects that are overlapped in the touched region 401 are determined to be first objects based on a percentage of overlap.

The 'g' object 403, the 'h' object 405, the 'v' object 407, and the 'b' object 409 are s shown to have overlap percentages of 55%, 21%, 9%, and 15%, respectively. If the reference percentage is 10%, the 'g' object 403, the 'h' object 405, and the object 'b' 409 having higher percentages of overlap than the reference overlap in the touched region 401, may be determined to be first objects. The terminal apparatus may display second objects corresponding to the first objects, that is, the 'g' object 403, the 'h' object 405, and the object 'b' 409 in an untouched region of the screen.

The terminal apparatus may reduce an error in selecting the second objects by displaying the second objects by adjusting, for example, sizes of the second objects based on the percentages of overlap of the objects in the touched region 401. For example, the terminal apparatus may adjust the size of a second object corresponding to the 'g' object 403 and the 'h' object 405 based on the percentages of overlap, which may be 55% and 21%, respectively.

Since the overlap of the 'g' object 403 is greater than the overlap of the 'h' object 405, the size of the second object corresponding to the 'g' object 403 may be enlarged in greater proportion than the second object corresponding to the 'h' object 405.

FIG. 5 is a diagram illustrating a smart touch operation according to an exemplary embodiment of the present invention.

Referring to FIG. 5, the terminal apparatus may recognize a touched region if a screen is touched, and may identify objects that are overlapped by the touch input by at least a reference percentage as the recognized touched region. The terminal apparatus may display second objects corresponding to the first objects in an untouched region of the screen. The terminal apparatus may display the second objects as processed information associated with the first objects.

Referring to FIG. 5, the terminal apparatus may recognize a touched region 501 if a screen providing a subway route map is touched, and may identify objects that are overlapped by the touch input by at least a reference percentage as first objects. In the recognized touched region 501, an object 503, an object 505, and an object 507 may be determined to be first objects. The first object 503 may correspond to a second object 'Naebang' 509, the first object 505 may correspond to a second object 'Bangbae' 511, and the first object 507 may correspond to a second object 'Seocho' 513.

The terminal apparatus may display second objects 'Naebang' 509, 'Bangbae' 511, and 'Seocho' 513, which may include station information and control setting menu to set a departure station with respect to the second objects. A control setting service, such as a service for setting a corresponding station or object as a departure station, or an informational service for providing information about the corresponding station or object, may be provided.

FIG. 6 is a diagram illustrating a smart touch operation according to an exemplary embodiment of the present invention.

Referring to FIG. 6, the terminal apparatus may recognize a touched region if a screen is touched, and may identify objects that are overlapped by the touch input by at least a reference percentage as first objects in the recognized touched region. The terminal apparatus may display second objects corresponding to the first objects in an untouched region of the screen. The terminal apparatus may display information related to the first objects, such as textual information, as second objects.

Referring to FIG. 6, the terminal apparatus may recognize a touched region 601 if a screen providing a webpage or a document is touched. The terminal apparatus may identify objects that are overlapped by at least a reference percentage in the recognized touched region 601 as first objects. Here, an object 603 and an object 605 may be determined to be first objects. Second object 607 and second object 609 may correspond to the first object 603 and the first object 605, respectively.

The terminal apparatus may display the second object 607 and the second object 609 by expanding a part of first object information to include information related to the first object. As shown in FIG. 6, the first object 603 may include characters "cers" and the corresponding second object 607 may expand on the first object 603 to include the entire word and related words to include "Senior officers". Similarly, the first object 609 may include characters "tion" and the corresponding second object 609 may expand on the second object 605 to include the entire word of "Communication". Accordingly, the second object 607 may include related information of the first object 603 and the second object 609 may include related information of the second object 605 so that the second objects may be viewed and selected more easily.

Figure 7:
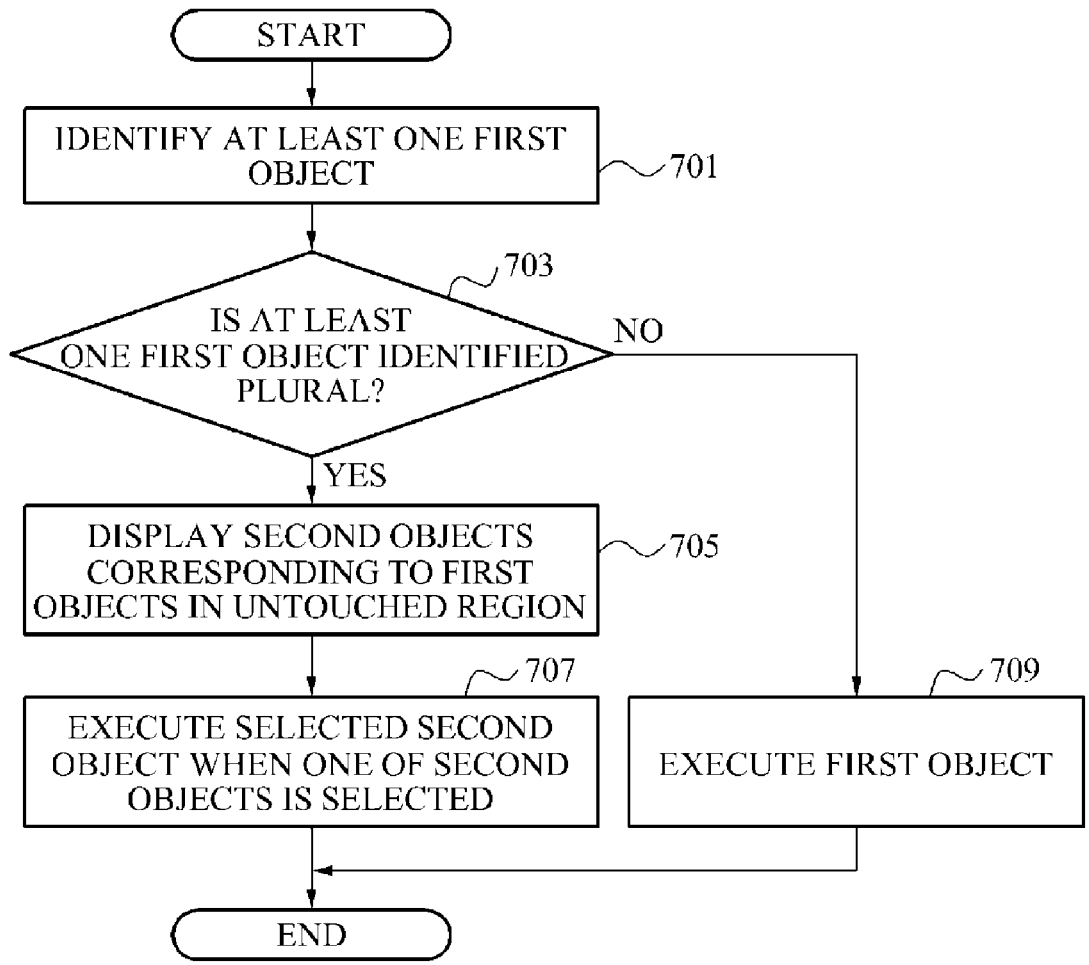
FIG. 7 is a flowchart illustrating a method for supporting a smart touch operation according to an exemplary embodiment of the present invention.

FIG. 7 is a flowchart illustrating a method for supporting a smart touch operation according to an exemplary embodiment of the present invention.

The method of FIG. 7 below is described as if the method is performed by a terminal apparatus, but is not limited as such.

Referring to FIG. 7, in operation 701, the terminal apparatus may recognize a region touched by a user on a screen, and may identify an object in the touched region. More particularly, the terminal apparatus may recognize the region touched by the user, and may identify one or more objects that may be overlapped by the touch input by at least a reference percentage in the recognized touched region. The terminal may identify, among a plurality of objects constituting the screen, N number of objects that may have at least a reference percentage of overlap in the touched region as first objects. Here, N may be a natural number.

In operation 703, the terminal apparatus may determine whether the number of first objects is plural.

In operation 705, the terminal apparatus may display first objects as individual objects in an untouched region of the screen as second objects if the number of first objects is determined to be plural. That is, if the number of first objects is determined to be plural, the terminal apparatus may generate and display second objects corresponding to the first objects in the untouched region of the screen.

Further, the terminal apparatus may determine an input direction of the touch using at least one of a form or shape of the touched region and a touch pressure associated with the touch. The terminal apparatus may then display the second objects in view or vicinity of the determined input direction so that the second objects may not be obscured by a touch input or an input apparatus touching the screen. In an example, the input apparatus may include, without limitation, a finger, a stylus, a touch input pen, or other similar apparatus to provide input.

If a direction starting from a lower right region to an upper left region is determined to be the input direction of the touch, the terminal apparatus may display the second objects in various directions except for a southeast direction corresponding to the input direction. Accordingly, the second objects may be more easily recognized.

If the touched region is recognized as being in close proximity to a boundary of the screen and the input direction faces the boundary, the terminal apparatus may display the second objects in a direction that is rotated by a reference angle based on the input direction. For example, in a case where the screen is in a rectangular form, the touched region may be recognized as being in close proximity to an upper-left portion of the screen or an upper-left corner portion, and the input direction faces the corner portion, the terminal apparatus may display the second objects in a direction that is rotated by a reference range of angles (e.g., 5° to 45°) based on the input direction so that the second objects may not be obscured by the touch input or input apparatus touching the screen. Accordingly, the second objects may be positioned within the screen.

The terminal apparatus may display the second objects, which may be adjusted in size based on respective percentages of overlap of the first objects in the touched region. If a first object has a reference percentage of overlap (e.g., 50%) in the touched region, the terminal apparatus may adjust a size of the first object to be in a corresponding manner (e.g., 150% increase in size), and may display the first object of which the size is adjusted as a second object. Accordingly, the second object may be displayed with limited obstruction.

The terminal apparatus may display second objects, which may expand textual information included in the first objects, or may display second objects as processed information associated with the first objects.

For example, the terminal apparatus may display a second object as textual information, which may be expanded from the information included in the first object. The second object may expand a part of article information included in the first object, which may be an article object (e.g., letters "ion" in the word "communication") that is overlapped in a touched region by a touch point. Article objects may be displayed on a screen providing a web page, documents, images, and the like. The terminal apparatus may parse letter information found on a webpage positioned in the touched region. Further, if the article object is associated with a hyperlink to a webpage or another source, the terminal apparatus may identify the letter information as an article object.

Also, the terminal apparatus may display a first object as small dots indicating a subway station, and a corresponding second object including station information on a subway route map. Further, the second object may be displayed as a menu, which may set or view departure station or arrival station information with respect to a corresponding station.

More specifically, the second object may include processed information associated with a station object that may be overlapped by a touch input in a touched region.

In operation 707, the terminal apparatus may execute a second object if the second object is selected. That is, the terminal apparatus may support an operation of the selected second object. The operation of the second object may include, without limitation, inputting of information corresponding to the second object (e.g., key letters, numbers, symbols, images, and the like), activating a hyperlink, activating an application associated with the second object, downloading a corresponding file, and the like. For example, in a case where the second object corresponds to keypad letter object, the terminal apparatus may input a keypad letter into an input window if the second object corresponding to the keypad letter is selected. In a case where the second objects correspond to article information objects, the terminal apparatus may provide selected article information via a new webpage if the corresponding second object is selected. Further, although not shown, if a second object is not selected, the terminal apparatus may execute a second object having a greatest percentage of overlap with the touch input, or may s execute a second object that most closely corresponds to other user inputs. For example, if a user is typing a message and types a "q" and then applies a touch input where a "u", and "w", and an "a" are listed as second objects, the terminal apparatus may execute the second object corresponding to the letter "u" even if the "u" as a second object is not selected.

In operation 709, if the number of first objects is determined not to be plural, that is, singular in number, the terminal apparatus may execute the single first object without displaying a second object and without waiting for a second object to be selected. An operation corresponding to the selected first object may be executed. The operation of the first object may include, without limitation, inputting of information corresponding to the first object (e.g., key letters, numbers, symbols, images, and the like), activating a hyperlink, activating an application associated with the second object, downloading a corresponding file, and the like.

According to exemplary embodiments of the invention, an object to be executed may be selected by identifying first objects that are overlapped by a touch input by at least a reference percentage in a touched region. In addition, second objects corresponding to the first objects may be displayed on an untouched region of the screen for selection.

According to exemplary embodiments of the invention, second objects corresponding to first objects may be displayed in view of an input direction of a touch input so that the second objects may not be obscured by the touch.

The exemplary embodiments of the invention may be recorded on computer-readable medium including program instructions to implement various operations embodied by a computer. The computer-readable medium may also include, alone or in combination of program instructions, data files, data structures, and the like. The computer-readable medium may be those specially designed and constructed for the purposes of the invention, or they may be of the kind well-known and available to those having skill in the computer software arts. Examples of computer-readable media include magnetic media such as hard disks, floppy disks, and magnetic tape; optical media, such as compact disc (CD) read-only memories (ROM) discs and digital versatile disc (DVD); magneto-optical media, such as floptical discs; and hardware devices that are specially configured to store and perform program instructions, such as ROM, random access memory (RAM), flash memory, and the like. Examples of program instructions include both machine codes, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal apparatus, comprising:
    an interface to detect a touch input, to detect a touch region corresponding to the touch input, and to identify an object that is overlapped by the touch input in the touch region as a first object;
    a processing unit to generate a second object based on the first object, and to display the second object in an untouched region; and
    a control unit to execute an operation corresponding to the second object if the second object is selected,
    wherein the control unit removes the display of the second object if the second object is not selected within a reference period of time.

2. The terminal apparatus of claim 1, wherein the interface further determines a direction of the touch input.

3. The terminal apparatus of claim 2, wherein the interface determines the direction of the touch input using at least one of a form of the touched region and a pressure of the touch input with respect to time.

4. The terminal apparatus of claim 3, wherein the form of the touched region is determined based on a dragging movement of the touch input.

5. The terminal apparatus of claim 2, wherein the processing unit displays the second object in a direction rotated by a reference angle relative to the direction of the touch input, the reference angle being based on at least one of the direction of the touch input and a location of the touch region.

6. The terminal apparatus of claim 1, wherein the second object is displayed in a pop-up form.

7. The terminal apparatus of claim 1, wherein the second object is adjusted in size relative to the first object based on a percentage of overlap of the first object by the touch input.

8. The terminal apparatus of claim 1, wherein the second object comprises information associated with the first object.

9. The terminal apparatus of claim 1, wherein the operation of the second object comprises at least one of inputting of information corresponding to the second object, activating a hyperlink, activating an application associated with the second object, and downloading a corresponding file.

10. The terminal apparatus of claim 1, wherein the control unit controls the interface to restrict a selection of the first object while the second object is selected.

11. The terminal apparatus of claim 1, wherein the interface identifies an object that is overlapped by the touch input by at least a reference percentage in the touch region as the first object.

12. A method for executing an operation according to a touch input, comprising:
    detecting a touch input and a corresponding touch region on a display of a terminal;
    identifying an object overlapped in the touch region as a first object;
    generating a second object based on the first object;
    displaying the second object in an untouched region;
    executing an operation corresponding to the second object if the second object is selected; and
    removing the display of the second object if the second object is not selected within a reference period of time.

13. The method of claim 12, further comprising determining a direction of the touch input.

14. The method of claim 13, wherein the direction of the touch input is determined using at least one of a form of the touched region and a pressure of the touch input with respect to time.

15. The method of claim 14, wherein the form of the touched region is determined based on a dragging movement of the touch input.

16. The method of claim 13, wherein the second object is displayed in a direction rotated by a reference angle relative to the direct of the touch input, the reference angle being based on at least one of the direction of the touch input and a location of the touch region.

17. The method of claim 12, wherein the second object is adjusted in size relative to the first object based on a percentage of overlap of the first object by the touch input.

18. The method of claim 12, wherein the second object comprises information associated with the first object.

19. A method for executing an operation according to a touch input, comprising:
    detecting a touch input and a corresponding touch region on a display of a terminal;
    identifying an object overlapped in the touch region as a first object;
    determining a direction of the touch input;
    generating a second object based on the first object;
    displaying the second object in an untouched region based on the direction of the touch input;
    executing an operation corresponding to the second object if the second object is selected for execution; and
    removing the display of the second object if the second object is not selected within a reference period of time,
    wherein the second object comprises information associated with the first object.

* * * * *